Oct. 17, 1939.  G. L. GROSS  2,176,764

FISH FREEZING ARRANGEMENT

Filed Feb. 2, 1938

INVENTOR.
George L. Gross.
BY Geo. Stevens.
ATTORNEY.

Patented Oct. 17, 1939

2,176,764

UNITED STATES PATENT OFFICE 2,176,764

FISH FREEZING ARRANGEMENT

George L. Gross, Duluth, Minn., assignor to Northern Cold Storage and Warehouse Company, Duluth, Minn., a corporation of Minnesota Application February 2, 1938, Serial No. 188,372

2 Claims. (Cl. 62—1)

This invention relates to apparatus for and method of freezing fresh fish, and the principal object of the invention is to provide means whereby to expedite the forming of layers of fish with a minimum of equipment.

Another object is to reduce the labor incident to the handling of receptacles for such purpose, as well as the space required for storage, both in the packing and freezing rooms.

Other objects and advantages of the invention will appear in the following description thereof.

Referring now to the accompanying drawing, forming part of this application, and wherein like reference characters indicate like parts:

Figure 1:
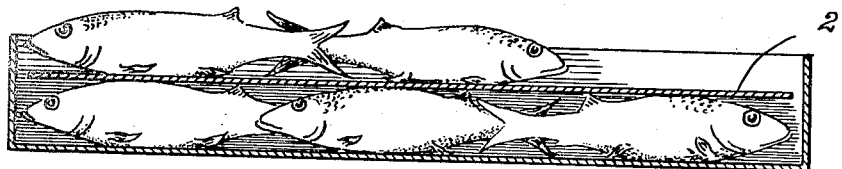
Figure 1 is a vertical section through one of the pans commonly used in the art with the removable division wall installed therein and as the combination is employed.
Figure 2:
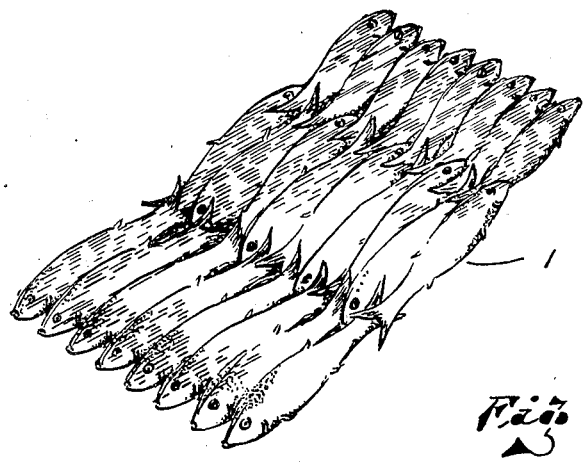
Figure 2 is a perspective view of one of the blocks of fish after being frozen.
Figure 3:
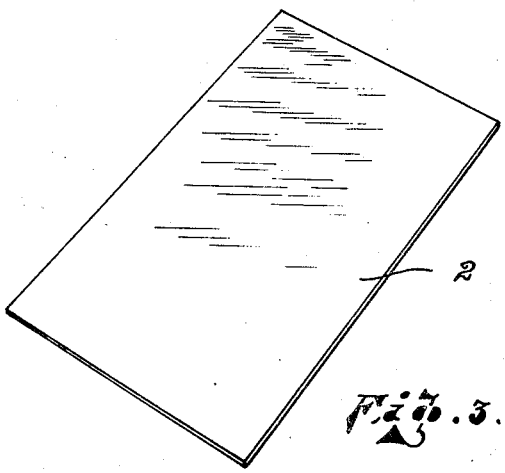
Figure 3 is a perspective view of one of the sheet metal division walls.

In the art of freezing and marketing frozen fish it has been the practice to place a number of fish, such as herring or the like, in a relatively shallow metal pan, arranging the fish preferably in three rows, those in the outside rows heading outwardly and those in the intermediate row having their heads and tails alternating between the tails of the fish in the outside rows, then freezing the fish thus arranged in the pans, then dipping the pans for a moment in water to release the attachment of the fish to the inner walls of the pan when they are readily removed from same for subsequent treatment, they being at this time in a solid sheet or brick such as illustrated in the accompanying drawing at 1.

The pans that are commonly used in this process are, as previously stated, relatively shallow, but when used in the freezing of herring, ciscos, or the like, usually project considerably above the layer of fish when placed in the bottom thereof, and, as pans of such uniform depth are common on the market, when freezing the smaller fish it has been attempted to make two layers of fish one upon the other in a single pan. This, however, has not proven satisfactory either in the nesting of the fish in the pan, or in the subsequent handling of the two frozen united layers, and, to overcome this difficulty and impractical use of the standard fish pans, as well as to double the capacity of the pans for such use in a given establishment engaged in this business, my present invention has been evolved, to wit: that of providing a thin but relatively rigid sheet of metal, considerably less in dimension than that of the inside of the pan with which used, one of such sheets being illustrated at 2 in the drawing. It is preferred that the length of the sheet should deviate more from that of the length of the pan than the comparative widths thereof, to expedite the handling of same within the pan.

Thus it is seen that when such a separate, horizontally disposed division wall is used on top of the first layer of fish when placed within the pan and as shown in Figure 1 of the drawing, a second layer of fish may be placed upon the division wall and grouped in exactly the same manner as the bottom layer, thus affording the most convenient means possible for accomplishing the service of a second pan, and that with little or no labor whatever in comparison with removing the first pan with only one layer therein and replacing it with another pan having but one layer. It will be noted too applicant's method eliminates the necessity of capital being invested to double the number of pans. In fact the use of such a device has proven to almost double the output of a plant engaged in such practice.

One of the pans, in the exact proportion of those commonly found in the art, is illustrated at 3 in the drawing, they being usually of galvanized iron, and the division wall 2 is also preferably formed of this material as it is found to function admirably in carrying out the purposes of the invention.

Having thus described my invention, what I claim and desire to secure by Letters Patent, is:

1. The combination with a fish freezing pan, of two layers of fish arranged therein, one layer above the other and a metallic plate interposed between said layers and arranged to prevent interfreezing of the top and bottom layers.

2. The combination with a fish freezing pan, of two layers of fish arranged therein one layer above the other and a plate of rigid material smaller in size than the interior of the pan interposed between said layers whereby to prevent interfreezing of the two layers.

GEORGE L. GROSS.